US008295405B2

(12) United States Patent
Yu et al.

(10) Patent No.: US 8,295,405 B2
(45) Date of Patent: Oct. 23, 2012

(54) APPARATUS AND METHOD FOR I/Q MISMATCH CALIBRATION

(75) Inventors: Hyun Kyu Yu, Daejeon (KR); Mun Yang Park, Daejeon (KR); Jae Hoon Shim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 412 days.

(21) Appl. No.: 12/629,018

(22) Filed: Dec. 1, 2009

(65) Prior Publication Data

US 2010/0142648 A1 Jun. 10, 2010

(30) Foreign Application Priority Data

Dec. 4, 2008 (KR) .................. 10-2008-0122211
Jul. 6, 2009 (KR) .................. 10-2009-0061163

(51) Int. Cl.
*H04L 27/22* (2006.01)

(52) U.S. Cl. ....................................................... 375/332

(58) Field of Classification Search .......... 375/279–281, 375/283, 329–332; 329/304, 345
See application file for complete search history.

(56) References Cited

U.S. PATENT DOCUMENTS

| 2005/0227642 | A1* | 10/2005 | Jensen .................... 455/127.1 |
| 2007/0099570 | A1* | 5/2007 | Gao et al. .................. 455/63.1 |
| 2008/0205536 | A1 | 8/2008 | Lee et al. |
| 2011/0013724 | A1* | 1/2011 | Metreaud et al. ............ 375/296 |

OTHER PUBLICATIONS

Li Yu et al., "A Novel Adaptive Mismatch Cancellation System for Quadrature IF Radio Receivers", IEEE Transactions on Circuits and Systems—II: Analog and Digital Signal Processing, Jun. 1999, pp. 789-801, vol. 46, No. 6.
Imtinan Elahi et al., "I/Q Mismatch Compensation Using Adaptive Decorrelation in a Low-IF Receiver in 90-nm CMOS Process", IEEE Journal of Solid-State Circuits, Feb. 2006, pp. 395-404, vol. 41, No. 2.
Hyung Chul Park et al., "Unified DC Offset Cancellation and IQ Regeneration with Carrier Phase Recovery in Five-Port Junction based Direct Receivers", Journal of IEEK, Jun. 2007, pp. 619-625, vol. 44.

* cited by examiner

*Primary Examiner* — Young T. Tse

(57) ABSTRACT

There is provided an apparatus and method for In-phase/Quadrature-phase (I/Q) mismatch calibration. The apparatus includes: a symmetrical point extracting part receiving continuous wave signals and extracting an I/Q channel average locus of the continuous wave signals; an error extracting part extracting a degree of distortion of the continuous wave signals from the extracted I/Q channel average locus; and a calibrating part calibrating a mismatch between I-channel signals and Q-channel signals of the continuous wave signals using the degree of distortion of the continuous wave signals.

14 Claims, 4 Drawing Sheets

APPARATUS AND METHOD FOR I/Q MISMATCH CALIBRATION

CROSS-REFERENCE TO RELATED APPLICATIONS

This application claims the priority of Korean Patent Application Nos. 10-2008-0122211 filed on Dec. 4, 2008 and 10-2009-0061163 filed on Jul. 6, 2009, in the Korean Intellectual Property Office, the disclosures of which are incorporated herein by reference.

BACKGROUND OF THE INVENTION

1. Field of the Invention

The present invention relates to an apparatus and method for In-phase/Quadrature-phase (I/Q) mismatch calibration, and more particularly, to an apparatus and method for I/Q mismatch calibration with more rapidity and reliability using the symmetry of continuous wave signals.

2. Description of the Related Art

A receiver of a high-speed wireless communications system causes signals received via an antenna to be demodulated through a Radio Frequency (RF) terminal and an Intermediate Frequency (IF) terminal, and then performs restoration of the signals.

The RF and IF terminals process the signals received via the antenna and perform frequency down converting and signal strength amplifying functions so as to obtain desired signals.

The RF and IF terminals utilize various analog devices including mixers and amplifiers. These devices satisfy standards to a certain degree, but there is a limitation on the coverage of standards. Due to imperfect insulation and orthogonality between the devices, input signal degradation may occur.

One of the reasons for signal degradation is a mismatch between an In-phase (I) channel and a Quadrature-phase (Q) channel.

The mismatch between the I-channel and the Q-channel is caused by each device's insulation state and the failure to generate signals having a perfect 90-degree phase difference between the I-channel and the Q-channel. The mismatch between the I-channel and the Q-channel is a factor in the degradation of the performance of a modem's demodulator that is intended for signal restoration. Therefore, there is a need for a solution to remove the mismatch between the I-channel and the Q-channel.

SUMMARY OF THE INVENTION

An aspect of the present invention provides an apparatus and method for In-phase/Quadrature-phase (I/Q) mismatch calibration in order to remove a mismatch between an I-channel and a Q-channel using the symmetry of continuous wave signals.

According to an aspect of the present invention, there is provided an I/Q mismatch calibration apparatus, the I/Q mismatch calibration apparatus including: a symmetrical point extracting part receiving continuous wave signals to extract an I/Q channel average locus of the continuous wave signals; an error extracting part extracting a degree of distortion of the continuous wave signals from the I/Q channel average locus extracted through the symmetrical point extracting part; and a calibrating part calibrating a mismatch between I-channel signals and Q-channel signals of the continuous wave signals using the degree of distortion of the continuous wave signals.

The calibrating part may rotate the I/Q channel average locus in order that a major axis of the I/Q channel average locus is located on an X axis thereof and allow a length of the major axis located on the X axis of the I/Q channel average locus and a length of a minor axis located on a Y axis of the I/Q channel average locus to coincide with each other by using the degree of distortion of the continuous wave signals, and normalize the I/Q channel average locus in a circular shape.

The error extracting part may extract a length difference between the major axis and the minor axis of the I/Q channel average locus and a phase difference between the major axis and the X axis thereof. The calibrating part may include a phase calibrating part rotating the I/Q channel average locus by taking into account the phase difference between the major axis and the X axis in order that the major axis of the I/Q channel average locus is located on the X axis thereof; and a normalizing part allowing the length of the major axis located on the X axis and the length of the minor axis located on the Y axis to coincide with each other by taking into account the length difference between the major axis and the minor axis, and normalizing the I/Q channel average locus in the circular shape.

The phase calibrating part may rotate the I/Q channel average locus in accordance with the following Equation:

$$I\_r_{rot} = I\_r \cdot \cos\theta_{rot} + Q\_r \cdot \sin\theta_{rot}$$

$$Q\_r_{rot} = Q\_r \cdot \cos\theta_{rot} + I\_r \cdot \sin\theta_{rot} \qquad \text{Equation}$$

The normalizing part may allow the length of the minor axis located on the Y axis of the rotated I/Q channel average locus to increase and coincide with the length of the major axis located on the X axis of the rotated I/Q channel average locus.

The symmetrical point extracting part may sample the continuous wave signals in the unit of cycles, average the sampled continuous wave signals, and extract the I/Q channel average locus.

According to another aspect of the present invention, there is provided a method of calibrating an I/Q mismatch, the method including: receiving continuous wave signals to extract an I/Q channel average locus of the continuous wave signals; extracting a degree of distortion of the continuous wave signals from the I/Q channel average locus; and calibrating a mismatch between I-channel signals and Q-channel signals of the continuous wave signals using the degree of distortion of the continuous wave signals.

The calibrating of the mismatch between the I-channel signals and the Q-channel signals of the continuous wave signals may include rotating the I/Q channel average locus in order that a major axis of the I/Q channel average locus is located on an X axis thereof and allowing a length of the major axis located on the X axis of the I/Q channel average locus and a length of a minor axis located on a Y axis of the I/Q channel average locus to coincide with each other by using the degree of distortion of the continuous wave signals; and normalizing the I/Q channel average locus in a circular shape.

The degree of distortion of the continuous wave signals may be a length difference between the major axis and the minor axis of the I/Q channel average locus and a phase difference between the major axis and the X axis thereof. The calibrating of the mismatch between the I-channel signals and the Q-channel signals of the continuous wave signals may include rotating the I/Q channel average locus by taking into account the phase difference between the major axis and the X axis in order that the major axis of the I/Q channel average locus is located on the X axis thereof; and allowing the length of the major axis located on the X axis and the length of the minor axis located on the Y axis to coincide with each other by taking into account the length difference between the major axis and the minor axis, and normalizing the I/Q channel average locus in the circular shape.

The rotating of the I/Q channel average locus may include rotating the I/Q channel average locus in accordance with the following Equation:

$$I\_r_{rot} = I\_r \cdot \cos\theta_{rot} + Q\_r \cdot \sin\theta_{rot}$$

$$Q\_r_{rot} = Q\_r \cdot \cos\theta_{rot} + I\_r \cdot \sin\theta_{rot} \qquad \text{Equation}$$

The normalizing of the I/Q channel average locus shape in the circular shape may include allowing the length of the minor axis located on the Y axis of the rotated I/Q channel average locus to increase and coincide with the length of the major axis located on the X axis of the rotated I/Q channel average locus.

The extracting of the I/Q channel average locus of the continuous wave signals may include sampling the continuous wave signals in the unit of cycles; averaging the sampled continuous wave signals; and extracting the I/Q channel average locus.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
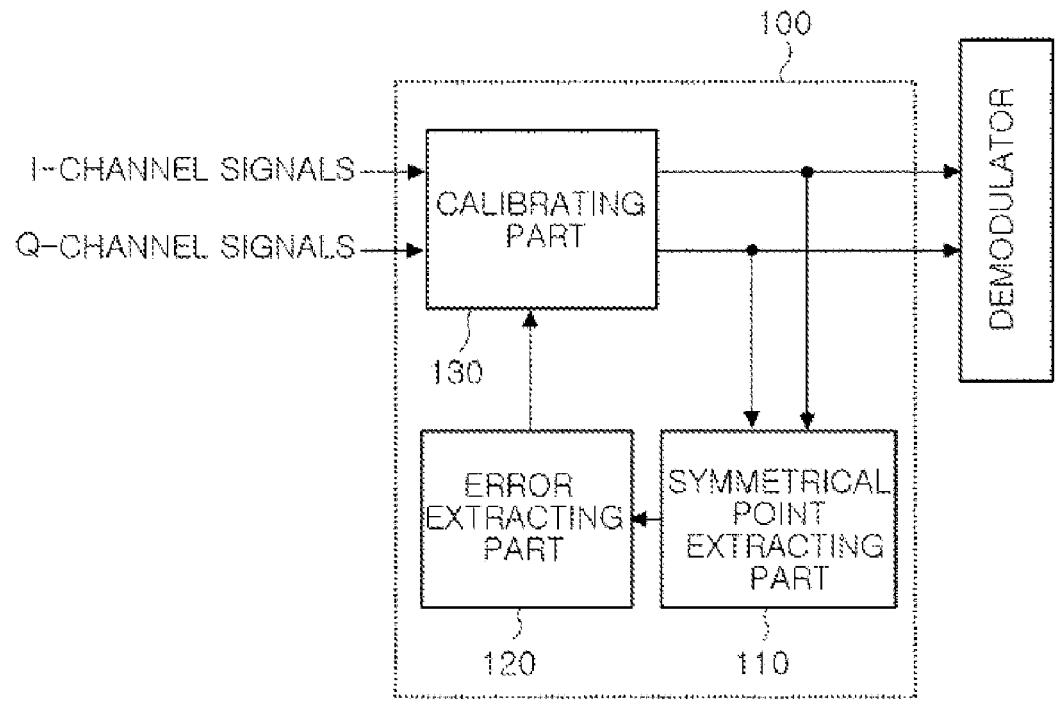
FIG. 1 illustrates a configuration for an In-phase/Quadrature-phase (I/Q) mismatch calibration apparatus according to an exemplary embodiment of the present invention.

Exemplary embodiments of the present invention will now be described in detail with reference to the accompanying drawings. However, detailed descriptions related to well-known functions or configurations will be ruled out in order not to unnecessarily obscure subject matters of the present invention.

In the drawings, parts irrelevant to the descriptions are omitted for clarity, and like reference numerals refer to like parts.

In addition, unless explicitly described to the contrary, the word "include" and variations such as "includes" or "including," will be understood to imply the inclusion of stated elements but not the exclusion of any other elements.

FIG. 1 illustrates a configuration for an In-phase/Quadrature-phase (IN) mismatch calibration apparatus according to an exemplary embodiment of the present invention.

Referring to FIG. 1, an I/Q mismatch calibration apparatus 100 includes a symmetrical point extracting part 110, an error extracting part 120, and a calibrating part 130.

The symmetrical point extracting part 110 receives continuous wave signals transmitted from a transmitter and extracts an I/Q channel average locus of the received continuous wave signals.

The error extracting part 120 calculates a length difference between a major axis L and a minor axis S of the I/Q channel average locus extracted through the symmetrical point extracting part 110 and a phase difference between the major axis L and an X axis thereof, and extracts the degree of distortion of the received continuous wave signals.

The calibration part 130 normalizes the I/Q channel average locus, extracted through the symmetrical point extracting part 110, in a circular shape using the degree of distortion of the continuous wave signals, thereby calibrating a mismatch between continuous wave I-channel signals and Q-channel signals generated due to signal distortion.

Since continuous wave signals have uniformity at all times, if the continuous wave signals are sampled in the unit of cycles and statistically averaged, an I/Q channel average locus of continuous wave signals insensitive to noise may be extracted.

Figure 2:
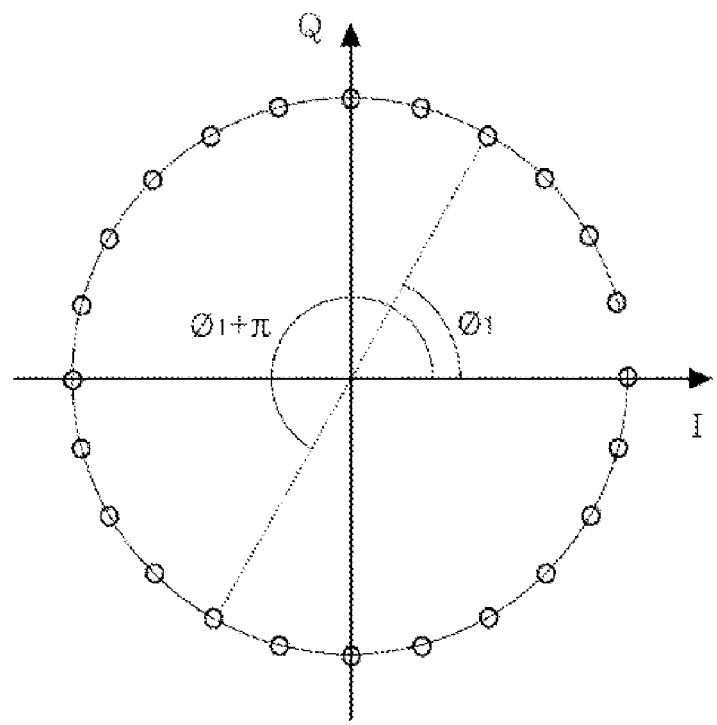
FIG. 2 is a locus diagram representing transmitted continuous wave signals as I/Q channel signals.
Figure 3:
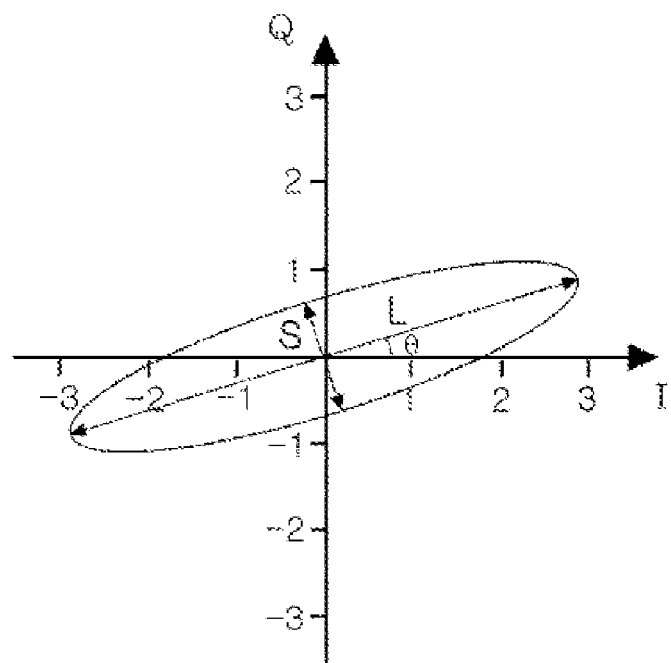
FIG. 3 is a locus diagram representing received continuous wave signals as I/Q channel signals.

When outputted from the transmitter, the continuous wave signals have a circular I/Q channel locus as shown in FIG. 2; however, when received by a receiver (i.e., the I/Q mismatch calibration apparatus), the continuous wave signals are mostly distorted by external communications environments, and thus have an elliptical I/Q channel locus as shown in FIG. 3.

Here, the elliptical I/Q channel locus has a major axis L and a minor axis S perpendicular to each other, and there may be a length difference between the major axis L and the minor axis S. Also, there may be a phase difference between the major axis L and an X axis.

Such a degree of distortion in the elliptical I/Q channel locus (i.e., the length difference between the major axis L and the minor axis S and the phase difference between the major axis L and the X axis) is proportional to the degree of distortion in the continuous wave signals (i.e., again error and a phase error between the continuous wave I-channel signals and Q-channel signals).

With the use of these continuous wave signal characteristics, the degree of distortion of the continuous wave signals is detected and the I/Q channel average locus is transformed into a shape prior to the distortion, whereby the continuous wave signal distortion is calibrated.

Figure 4:
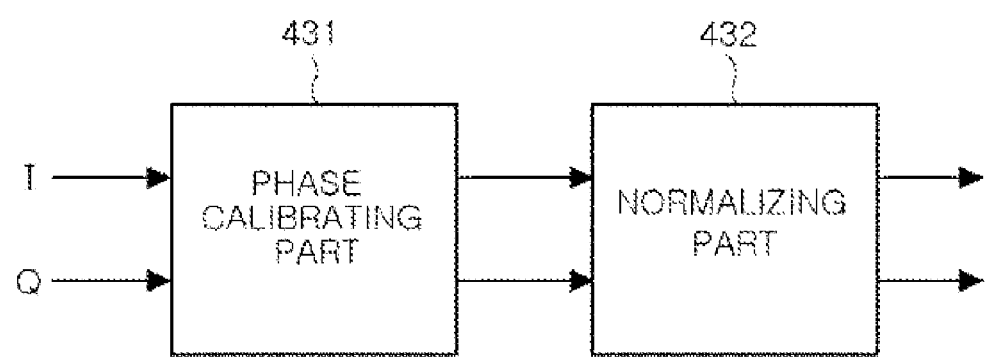
FIG. 4 illustrates a configuration for a calibrating part used in an I/Q mismatch calibration apparatus according to an exemplary embodiment of the present invention.

FIG. 4 illustrates a configuration for a calibrating part used in an I/Q mismatch calibration apparatus according to an exemplary embodiment of the present invention.

Referring to FIG. 4, a calibrating part 430 includes a phase calibrating part 431 and a normalizing part 432.

The phase calibrating part 431 rotates an I/Q channel average locus, extracted through the symmetrical point extracting part 110, according to a phase difference $\theta_{rot}$ between a major axis L and an X axis extracted from the error extracting part 120, thereby allowing the major axis L of the I/Q channel average locus to be located on the X axis thereof. This operation may be expressed by Equation 1.

$$I\_r_{rot} = I\_r \cdot \cos\theta_{rot} + Q\_r \cdot \sin\theta_{rot}$$

$$Q\_r_{rot} = Q\_r \cdot \cos\theta_{rot} + I\_r \cdot \sin\theta_{rot} \qquad \text{Equation 1}$$

In the above Equation 1, $\theta_{rot}$ is the phase difference between the major axis L and the X axis.

The normalizing part 432 allows the length of the major axis L located on the X axis of the I/Q channel average locus rotated by the phase calibrating part 431 and the length of the minor axis S located on a Y axis of the I/Q channel average locus to coincide with each other, by using the length difference between the major axis L and the minor axis S extracted from the error extracting part 120. That is, the normalizing part 432 normalizes the I/Q channel average locus from an elliptical shape to a circular shape.

Figure 5A:
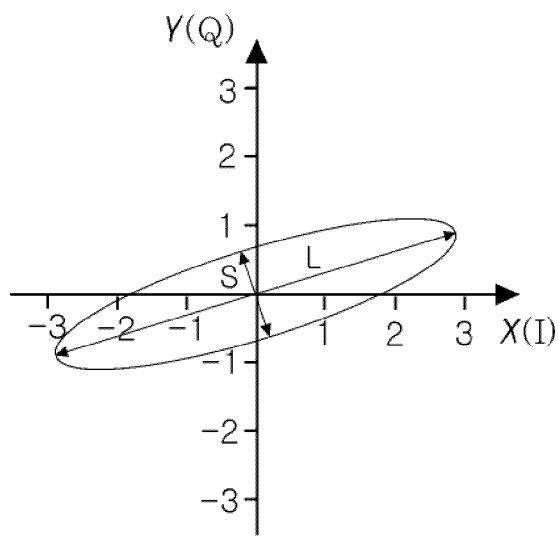
FIGS. 5A to 5C illustrate locus diagrams according to I/Q mismatch calibration order in a calibrating part used in an I/Q mismatch calibration apparatus according to an exemplary embodiment of the present invention.
Figure 5B:
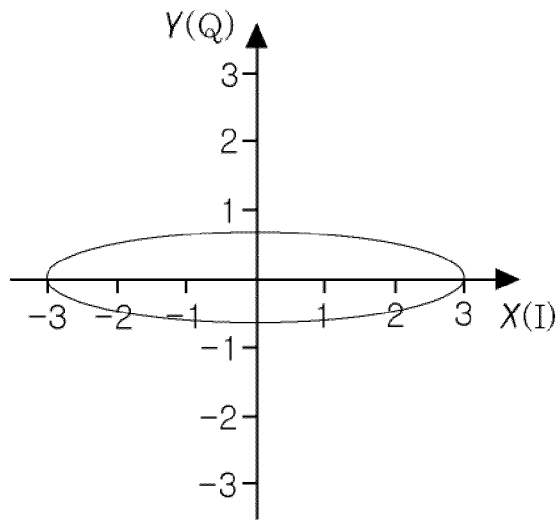
Figure 5C:
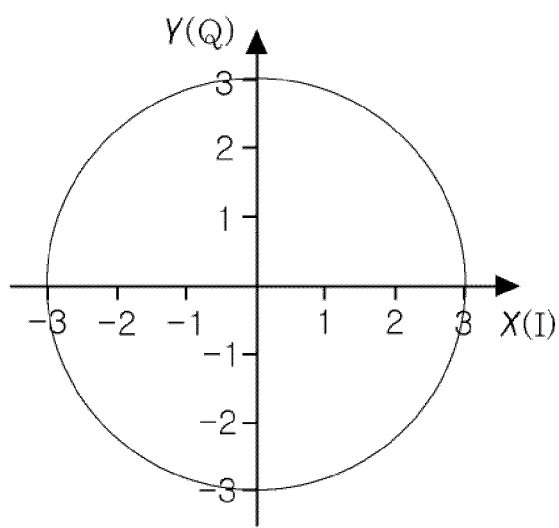

FIGS. 5A to 5C illustrate locus diagrams according to I/Q mismatch calibration order in a calibrating part used in an I/Q mismatch calibration apparatus according to an exemplary embodiment of the present invention. FIGS. 5A through 5C illustrate an I/Q channel average locus extracted from the symmetrical point extracting part 110, an I/Q channel average locus rotated by the calibrating part 430, and an I/Q channel average locus normalized in a circular shape by the calibrating part 430, respectively.

As described above, even though the transmitter provides ideal continuous wave signals, the receiver may receive distorted continuous wave signals.

In this case, the I/Q channel average locus, extracted through the symmetrical point extracting part 110 of the I/Q mismatch calibration apparatus, may be depicted as an elliptical shape like FIG. 5A.

The calibrating part 430 rotates the elliptical I/Q channel average locus according to the phase difference between the major axis L and the X axis extracted from the error extracting part 120, thereby allowing the major axis L of the I/Q channel average locus to be located on the X axis thereof as shown in FIG. 5B. Here, since the major axis L is perpendicular to the minor axis S, if the major axis L is located on the X axis, the minor axis S is automatically located on the Y axis.

Then, the calibrating part 430, as shown in FIG. 5C, allows the length of the minor axis S located on the Y axis to increase and coincide with the length of the major axis L according to the length difference between the major axis L and the minor axis S extracted from the error extracting part 120.

Accordingly, the elliptical I/Q channel average locus is normalized in a circular shape, and therefore, an I/Q channel mismatch, such as a gain error and a phase error between continuous wave I-channel signals and Q-channel signals, is automatically calibrated.

Figure 6:
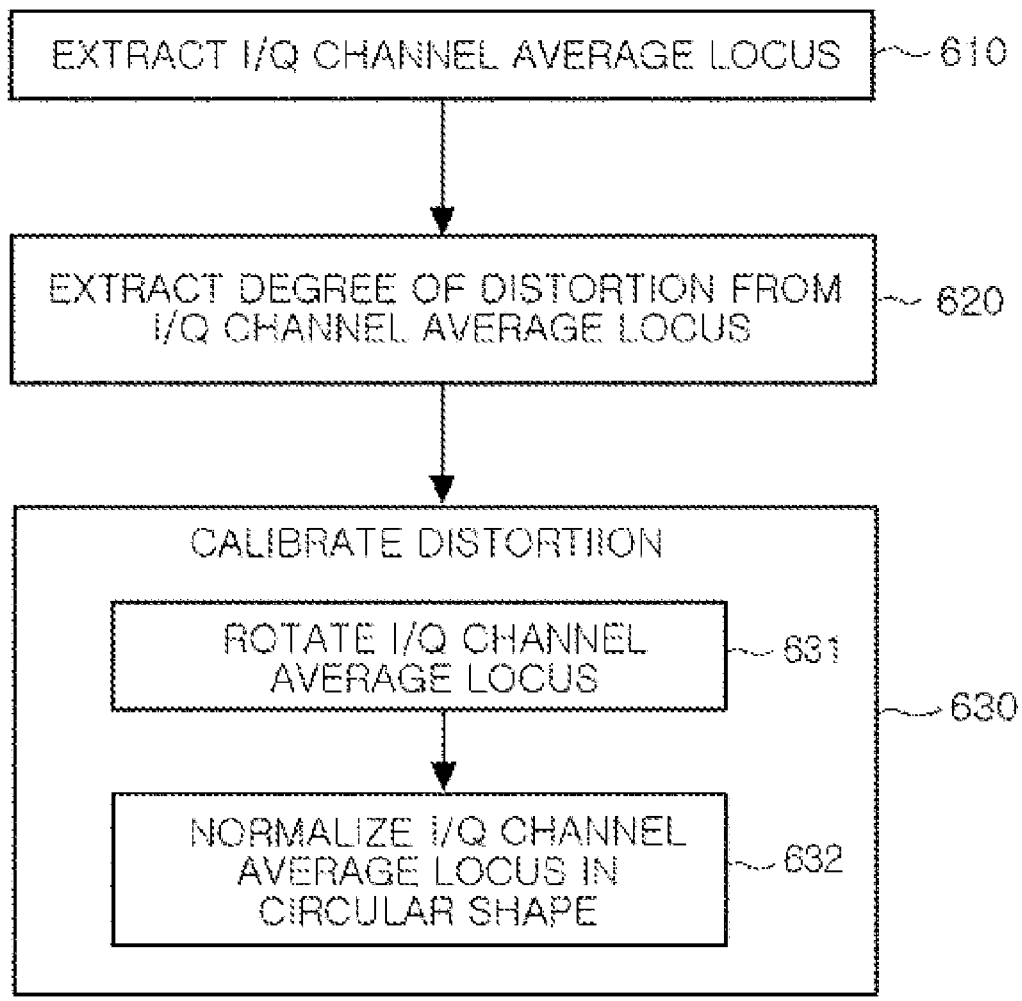
FIG. 6 is a flowchart illustrating a method of calibrating an I/Q mismatch according to an exemplary embodiment of the present invention.

FIG. 6 is a flowchart illustrating a method of calibrating an I/Q mismatch according to an exemplary embodiment of the present invention.

Referring to FIG. 6, the method of calibrating the I/Q mismatch according to this embodiment includes obtaining an I/Q channel average locus in operation 610, extracting the degree of distortion in operation 620, and calibrating the distortion in operation 630.

In operation 610, received continuous wave signals are sampled in the unit of cycles and statistically averaged, and the I/Q channel average locus of the received I/Q signals is accordingly extracted. The I/Q channel average locus obtained in this operation may be an elliptical locus.

In operation 620, the degree of distortion between the received I/Q channel continuous wave signals is extracted on the basis of the I/Q channel average locus. In this embodiment, a length difference between a major axis L and a minor axis S of the elliptical I/Q channel average locus obtained in operation 610 and a phase difference between the major axis L and an X axis thereof are extracted.

In operation 630, the I/Q channel average locus is normalized from an elliptical shape to a circular shape using the degree of distortion extracted in operation 620. That is, the I/Q channel average locus of the received I/Q signals is calibrated to the I/Q channel locus of the continuous wave signals as it is when outputted from the transmitter.

Here, the operation 630 includes rotating the elliptical I/Q channel average locus of the received I/Q signals and causing the major axis L and the X axis of the I/Q channel average locus to coincide with each other in operation 631, and causing the length of the major axis L located on the X axis of the rotated I/Q channel average locus and the length of the minor axis S located on the Y axis of the rotated I/Q channel average locus to coincide with each other in operation 632.

As set forth above, according to exemplary embodiments of the invention, I/Q mismatch calibration may be performed more rapidly and reliably by using the symmetry of the continuous wave signals.

Also, since the present invention uses the continuous wave signals irrelevant to modulated signals, it may be used widely in random receivers.

While the present invention has been shown and described in connection with the exemplary embodiments, it will be apparent to those skilled in the art that modifications and variations can be made without departing from the spirit and scope of the invention as defined by the appended claims.

What is claimed is:

1. An In-phase/Quadrature-phase (I/Q) mismatch calibration apparatus comprising:
   a symmetrical point extracting part configured to receive first I/Q channel signals and extract an I/Q channel average locus of the first I/Q channel signals;
   an error extracting part configured to receive the I/Q channel average locus from the symmetrical point extracting part and calculate a degree of distortion of the first I/Q channel signals based on the I/Q channel average locus; and
   a calibrating part configured to receive the degree of distortion from the error extracting part and calibrate a mismatch between first I-channel signals and first Q-channel signals of the first I/Q channel signals based on the degree of distortion of the first I/Q channel signals to generate second I/Q channel signals.

2. The I/Q mismatch calibration apparatus of claim 1, wherein the calibrating part is configured to rotate the I/Q channel average locus so that a major axis L of the I/Q channel average locus is located on an X axis thereof and to calibrate a length of the major axis L located on the X axis of the I/Q channel average locus and a length of a minor axis S located on a Y axis of the I/Q channel average locus so that the length of the major axis L coincides with the length of the minor axis S by using the degree of distortion of the first I/Q channel signals to normalize the I/Q channel average locus into a circular shape.

3. The I/Q mismatch calibration apparatus of claim 2, wherein the error extracting part is configured to extract a length difference between the major axis L and the minor axis S of the I/Q channel average locus and a phase difference between the major axis L and the X axis.

4. The I/Q mismatch calibration apparatus of claim 3, wherein the calibrating part comprises:
   a phase calibrating part configured to rotate the I/Q channel average locus by taking into account the phase difference between the major axis L and the X axis so that the major axis L of the I/Q channel average locus is located on the X axis thereof; and
   a normalizing part configured to calibrate the length of the major axis L located on the X axis and the length of the minor axis S located on the Y axis so that the length of the major axis L coincides with the length of the minor axis S by taking into account the length difference between the major axis L and the minor axis S to normalize the I/Q channel average locus into the circular shape.

5. The I/Q mismatch calibration apparatus of claim 4, wherein the phase calibrating part is configured to rotate the I/Q channel average locus in accordance with the following Equation:

$$I\_r\_{rot} = I\_r \cdot \cos\theta\_{rot} + Q\_r \cdot \sin\theta\_{rot}$$

$$Q\_r\_{rot} = Q\_r \cdot \cos\theta\_{rot} + I\_r \cdot \sin\theta\_{rot}$$

wherein $\theta_{rot}$ is the phase difference between the major axis L and the X axis, and wherein $I\_r\_{rot}$ is the first I channel signals rotated, $Q\_r\_{rot}$ is the first Q channel signals rotated, $I\_r$ is the first I channel signals received, and $Q\_r$ is the first Q channel signals received.

6. The I/Q mismatch calibration apparatus of claim 4, wherein the normalizing part is configured to calibrate the length of the minor axis S located on the Y axis of the rotated I/Q channel average locus to increase so that it coincides with the length of the major axis L located on the X axis of the rotated I/Q channel average locus.

7. The I/Q mismatch calibration apparatus of claim 1, wherein the symmetrical point extracting part is configured to sample the first I/Q channel signals in a unit of cycles, average the sampled first I/Q channel signals, and extract the I/Q channel average locus.

8. A method of calibrating an In-phase/Quadrature-phase (I/Q) mismatch, the method comprising:
  receiving first I/Q channel signals and extracting an I/Q channel average locus of the first I/Q channel signals;
  calculating a degree of distortion of the first I/Q channel signals using the I/Q channel average locus; and
  calibrating a mismatch between first I-channel signals and first Q-channel signals of the first I/Q channel signals using the degree of distortion of the first I/Q channel signals to generate second I/Q channel signals.

9. The method of claim 8, wherein the calibrating of the mismatch between the first I-channel signals and the first Q-channel signals of the first I/Q channel signals comprises:
  rotating the I/Q channel average locus so that a major axis L of the I/Q channel average locus is located on an X axis thereof; and
  adjusting a length of the major axis L located on the X axis of the I/Q channel average locus and a length of a minor axis S located on a Y axis of the I/Q channel average locus so that the length of the major axis L coincides with the length of the minor axis S by using the degree of distortion of the first I/Q channel signals; and normalizing the I/Q channel average locus into a circular shape.

10. The method of claim 9, wherein the degree of distortion of the first I/Q channel signals includes (i) a length difference between the major axis L and the minor axis S of the I/Q channel average locus and (ii) a phase difference between the major axis L and the X axis thereof.

11. The method of claim 10, wherein the calibrating of the mismatch between the first I-channel signals and the first Q-channel signals of the first I/Q channel signals comprises:
  rotating the I/Q channel average locus by taking into account the phase difference between the major axis L and the X axis so that the major axis L of the I/Q channel average locus is located on the X axis;
  calibrating the length of the major axis L located on the X axis and the length of the minor axis S located on the Y axis so that the length of the major axis L coincides with the length of the minor axis L by taking into account the length difference between the major axis L and the minor axis S; and
  normalizing the I/Q channel average locus into the circular shape.

12. The method of claim 11, wherein the rotating of the I/Q channel average locus comprises rotating the I/Q channel average locus in accordance with the following Equation:

$$I\_r\_{rot} = I\_r \cdot \cos\theta\_{rot} + Q\_r \cdot \sin\theta\_{rot}$$

$$Q\_r\_{rot} = Q\_r \cdot \cos\theta\_{rot} + I\_r \cdot \sin\theta\_{rot}$$

where $\theta_{rot}$ is the phase difference between the major axis L and the X axis, and wherein $I\_r\_{rot}$ is the first I channel signals rotated, $Q\_r\_{rot}$ is the first Q channel signals rotated, $I\_r$ is the first I channel signals received, and $Q\_r$ is the first Q channel signals received.

13. The method of claim 11, wherein the normalizing of the I/Q channel average locus into the circular shape comprises adjusting the length of the minor axis S located on the Y axis of the rotated I/Q channel average locus to coincide with the length of the major axis L located on the X axis of the rotated I/Q channel average locus.

14. The method of claim 8, wherein the extracting of the I/Q channel average locus of the first I/Q channel signals comprises:
  sampling the first I/Q channel signals in a unit of cycles;
  averaging the sampled first I/Q channel signals; and
  extracting the I/Q channel average locus.

* * * * *